United States Patent [19]

Arena et al.

[11] 4,174,843
[45] Nov. 20, 1979

[54] SELF-ADJUSTING TANDEM SEAL

[75] Inventors: John P. Arena, Middletown, R.I.; Charles G. McGuigan, Arlington, Va.; Gene A. Rossi, North Providence, R.I.

[73] Assignee: The United States of America as represented by the Secretary of the Navy, Washington, D.C.

[21] Appl. No.: 913,935

[22] Filed: Jun. 8, 1978

[51] Int. Cl.$^2$ .................. F16J 15/40; F16J 15/34
[52] U.S. Cl. ........................... 277/3; 277/27; 277/74; 277/65
[58] Field of Search .................. 277/3, 27, 29, 65, 71, 277/75, 74, 91, 59, 61, 62

[56] References Cited

U.S. PATENT DOCUMENTS

| 2,033,403 | 3/1936 | Smittle | 277/65 X |
| 2,895,751 | 7/1959 | Standish | 277/3 |
| 3,088,744 | 5/1963 | Ezekiel et al. | 277/3 |
| 3,090,654 | 5/1963 | Wald et al. | 277/3 X |
| 3,093,382 | 6/1963 | Macks | 277/74 X |
| 3,318,604 | 5/1967 | Tracy | 277/27 |
| 3,506,276 | 4/1970 | Petersen et al. | 277/91 |
| 3,659,860 | 5/1972 | Muller | 277/59 |
| 3,685,842 | 8/1972 | Cyphelly | 277/74 |
| 3,759,532 | 9/1973 | Lindeboom | 277/74 X |
| 3,804,424 | 4/1974 | Gardner | 277/74 X |

FOREIGN PATENT DOCUMENTS

| 470611 | 5/1969 | Switzerland | 277/74 |
| 830059 | 3/1960 | United Kingdom | 277/74 |
| 831168 | 3/1960 | United Kingdom | 277/3 |
| 862553 | 3/1961 | United Kingdom | 277/74 |
| 980895 | 1/1965 | United Kingdom | 277/74 |
| 1032864 | 6/1966 | United Kingdom | 277/75 |
| 1227632 | 4/1971 | United Kingdom | 277/74 |

*Primary Examiner*—Robert S. Ward, Jr.
*Attorney, Agent, or Firm*—Richard S. Sciascia; Arthur A. McGill; Prithvi C. Lall

[57] ABSTRACT

A dynamic seal has a primary and secondary seal ring connected in series between first and second fluid zones, with an intermediate fluid zone between the seal rings. When leakage occurs between the first and intermediate zones, the pressure in the intermediate zone builds up through a feedback system increasing the force on the primary seal rings. Furthermore, leakage through the primary seal also takes place creating another force that also provides a tighter seal. In addition, the primary and secondary seal rings have additional variable and feedback controls for adjusting the force on the dynamic seal.

10 Claims, 2 Drawing Figures

SELF-ADJUSTING TANDEM SEAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to fluid seals and more particularly to the sealing of rotary shafts wherein both dynamic and static seals are utilized. The invention is uniquely applicable to the sealing of propeller shafts that are located underwater for driving both underwater and surface vessels.

Many prior art devices for providing sealing systems are readily available. For providing static seals, O-rings are commonly used. For rotary dynamic seals two smooth plates can be utilized with pressure exerted on one of both of the plates to hold them in equilibrium with each other. A fluid film normally forms between the mating pieces. A plurality of systems for providing a force to hold the mating pieces in equilibrium with each other have been developed. Among these are a simple spring or bellows arrangement in which one of the plates has axial movement. In such a system the spring or bellows is placed on the end of one of the plates that has slight axial movement in relation to the other plate. The end of the plate chosen is the one away from the mating plate so that the spring exerts a force holding the two plates in abutment.

Another known system uses fluid pressures that tend to equalize on the front and back sides of the movable seal plate. However, the back side of the movable seal plate has a larger area thereby increasing the force to keep the seal plate tight against its mating component.

Such devices, although useful, cannot have the force varied to a desired amount should outside pressures increase such as when a submarine submerges to a lower depth. They are also incapable of being varied as slight differences in optimum closing force occur over extended periods of time as slight wear occurs on mating surfaces. Other influences on optimum closing force include viscosity, density, ambient pressure, speed, temperature, etc. Variable pressure systems have been developed but are for the most part complex with flowing fluid necessary in the operation of such devices.

SUMMARY OF THE INVENTION

It is therefore a general object of the present invention to provide an improved fluid sealing system. It is a further object that the system include a dynamic seal and be suitable for underwater use on the shaft of a propeller. Another object is that the pressure holding the seal in place by physically variable by an operator. An additional object is that a feedback pressure for self-regulation be employed. Another object is that the device has an auxiliary system for use if failure occurs in the primary seal. Additional objects are that the sealing system has improved performance, reliability and safety. These and other objects of the invention and the various features and details of construction and operation will become apparent from the specification and drawings.

This is accomplished in accordance with the present invention by providing a tandem sealing system having a first and second face seal. The second face seal comes into operation should the first fail and also acts to create an intermediate fluid zone. Both seals utilize a variable pressure system for holding the dynamic seal in equilibrium with the desired operational requirements. The pressure system is suitable for manual control depending on the use and conditions encountered by the dynamic seals. Both seals have feedback systems for automatically increasing pressure if the ambient pressure increases. In addition, a plurality of static seals are utilized to prevent the flow of the surrounding fluid throughout the system and for providing a boundary for the variable pressure.

DESCRIPTION OF THE PREFERRED EMBODIMENT

Figures 1, 2:
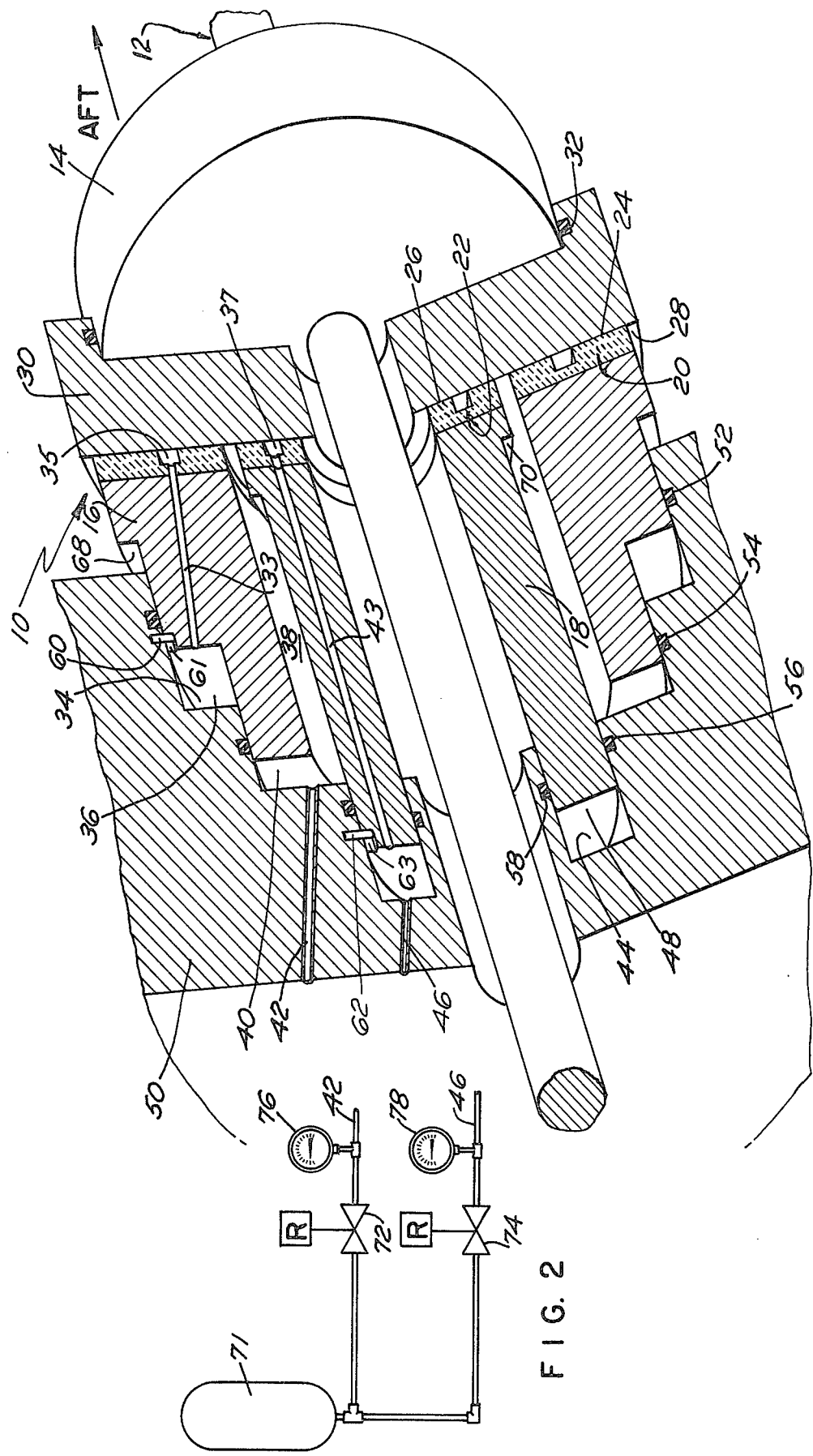
FIG. 1 is a cutaway perspective view of a tandem sealing system in accordance with the present invention.
FIG. 2 is a pictorial-schematic representation of a variable pressure source suitable for use in conjunction with the tandem sealing system of FIG. 1.

Referring now to FIG. 1 there is shown a tandem dynamic face seal system 10. The system 10 includes a drive shaft 12 with a collar 14. The drive shaft 12 is suitable for driving a propeller at its aft end. The collar 14 is rigidly affixed to the drive shaft 12 and is rotated in unison with the shaft 12 during operation.

A pair of seal rings 16 and 18 have respective carbon seals 20 and 22. Each seal has a smooth face 24 and 26 mating with surface 28 of mating ring 30. An O-ring 32 provides a static seal between mating ring 30 and collar 14. In operation, the mating ring 30 and O-ring 32 rotate in unison with the shaft 12 and collar 14.

Seal rings 16 and 18 are in abutment with the hull 50 of a vessel. Static O-rings 52 and 54 are located between seal ring 16 and hull 50, and static O-rings 56 and 58 are located between seal ring 18 and hull 50. Pins 60 and 62 located in respective slots 61 and 63 are placed between the hull 50 and respective seal rings 16 and 18 to prevent any rotation between the hull 50 and either seal ring 16 or 18 while permitting slight axial movement of the seal rings 16 and 18.

The surrounding medium aft of the hull 50 is sea water. The seal ring 16 has a shoulder 68 so that pressure from the surrounding medium adds force to the seal ring 16 in the aft direction. The seal ring 16 has a surface 40 and the seal ring 18 has a shoulder 70 so that pressure introduced into cavity 38 through tube 42 adds force to seal rings 16 and 18 in the aft direction.

A drilled passage 33 extends from a circumferential groove 35, through seal ring 16, to cavity 34. The groove 35 is of predetermined width and depth to create an equilibrium pressure zone. External fluid pressure leaking between faces 24 and 28 into passage 33 cause a pressure in cavity 34. This varies the pressure on wall 36 thereby forcing seal ring 16 in the aft direction changing the film thickness between faces 24 and 28. This tends to inhibit the leakage between carbon seal 20 and mating ring 30.

If external fluid pressure leaking should extend across seal ring 16, the fluid pressure builds up in circumferential cavity 38. This increases pressure on surface 40 which tends to inhibit leakage between carbon seal 20 and mating ring 30. A tube 42 is extended into cavity 38 so that additional pressure can be applied to wall 40 to inhibit leakage.

A drilled passage 43 extends from a circumferential groove 37, through seal ring 18, to cavity 44. The groove 37 is of predetermined width and depth to create an equilibrium zone. In addition a tube 46 extends into cavity 44 so that pressure can be applied to wall 48. Should leakage occur across face 26, the feedback pressure through groove 43 and external pressure through tube 46 places increased pressure on wall 48 to inhibit the leakage.

The equipment of FIG. 2 is located in the interior of the vessel, forward of hull 50 in FIG. 1. There is shown a pressure source of air 71 connected to parallel tubes 42 and 46 through respective pressure regulator valves 72 and 74. Gauges 76 and 78 are connected for monitoring the pressure in respective cavities 38 and 44. If desired, the pressure regulator valves 72 and 74 may be biased to chambers such as 34 or to the ambient sea to provide a relative pressure.

The system in operation has drive shaft 12, collar 14, mating ring 30 and O-ring 32, all rotating in unison. The seal rings 16 and 18 move axially very slightly. The rest of the components remain relatively static. The dynamic seal is formed between rotating mating ring 30 and the carbon seals 20 and 22 of respective seal rings 16 and 18. A fluid film is normally formed at the dynamic seal interface of carbon seal 20 and mating ring 30 during operation. The seal ring 16 is forced aft during operation by the variable pressure introduced into chamber 38 against wall 40, the surrounding medium exerting pressure against shoulder 68, and the feedback pressure in circumferential cavity 34 against surface 36. Seal ring 18 is forced aft by the pressure introduced into chamber 38 against shoulder 70, and both feedback pressure through passage 43 and variable pressure through tube 46. These last two pressures force against wall 48 of seal ring 18.

There has, therefore, been described a system allowing both feedback and physical external control to satisfy varying operating conditions. The external control permits adjustment in the closing force. In addition a backup seal is present should leakage occur in the primary seal. This improves the performance, reliability and safety of the dynamic face seal. In addition to propeller shafts the invention is also suitable for pumps and other devices requiring a dynamic seal.

Alternate embodiments could contain more than two dynamic seals and one or more chambers and passages could be used for control or monitoring. Self-adjusting passages, chambers and grooves may be used with or without a control or monitoring passage.

It will be understood that many additional changes in the details, materials, steps and arrangement of parts, which have been herein described and illustrated in order to explain the nature of the invention, may be made by those skilled in the art within the principal and scope of the invention as expressed in the appended claims.

What is claimed is:

1. An adjustable dynamic feedback seal system comprising:
    a seal ring having at least one feedthrough aperture for providing feedback pressure to said seal ring;
    a mating ring adapted for abutting with said seal ring and having a common axis with said seal ring, said mating ring adapted to be rotated with respect to said seal ring; and
    a chamber located at an end of said seal ring away from said mating ring and venting an end of said at least one feedthrough aperture, said chamber being otherwise sealed.

2. An adjustable tandem dynamic feedback seal system comprising:
    a first seal ring having at least one feedthrough aperture for providing feedback pressure to said first seal ring;
    a second seal ring located in series with said first seal ring;
    a mating ring adapted for abutting with said first and second seal rings and having a common axis with said first and second seal rings, said mating ring adapted to be rotated with respect to said first and second seal rings;
    a first chamber located at an end of said first seal ring away from said mating ring and venting an end of said at least one feedthrough aperture of said first seal ring;
    a second chamber located at an end of said second seal ring away from said mating ring and venting an end of said at least one feedthrough aperture of said second seal ring; and
    first venting means for introducing a fluid pressure for varying the force in which said first seal ring and said second seal ring abuts said mating ring.

3. An adjustable tandem dynamic feedback seal system according to claim 2 wherein said first seal ring feedthrough aperture includes a circumferential groove at an end of said feedthrough aperture that is adapted for abutting with said mating ring.

4. An adjustable tandem dynamic feedback seal system according to claim 3 wherein said second seal ring includes at least one feedthrough aperture for providing feedback pressure to said second seal ring.

5. An adjustable tandem dynamic seal system according to claim 4 wherein said second seal ring feedthrough aperture includes a circumferential groove at an end of said feedthrough aperture that is adapted for abutting with said mating ring.

6. An adjustable tandem dynamic feedback seal system according to claim 5 further comprising a shaft assembly abutting said mating ring.

7. An adjustable tandem dynamic feedback seal system according to claim 6 wherein said first seal ring has a radial surface orthogonal to the seal ring axis at a portion of said seal ring away from said mating ring, said radial surface being exposed to outside ambient pressures.

8. An adjustable tandem dynamic feedback seal system according to claim 7 wherein said first and second chambers are circumferential.

9. An adjustable dynamic feedback seal system according to claim 8 wherein said first and second seal rings having respective carbon faces adapted to abut with said mating ring.

10. An adjustable dynamic feedback seal system according to claim 9 further including second venting means for introducing a fluid pressure for varying the force in which said second seal ring abuts said mating ring.

* * * * *